US012656162B1

(12) United States Patent
Bergen et al.

(10) Patent No.: US 12,656,162 B1
(45) Date of Patent: Jun. 16, 2026

(54) METHODS AND SYSTEMS FOR DETERMINING THE AVAILABLE STORAGE CAPACITY OF AN ENCLOSED SPACE

(71) Applicant: Pro-Vision Spartan Radar, LLC, Byron Center, MI (US)

(72) Inventors: Scott Bergen, New Canaan, CT (US); Tyler Rather, Redondo Beach, CA (US); Robert Wedeen, Torrance, CA (US)

(73) Assignee: Pro-Vision Spartan Radar, LLC, Byron Center, MI (US)

( * ) Notice: Subject to any disclaimer, the term of this patent is extended or adjusted under 35 U.S.C. 154(b) by 206 days.

(21) Appl. No.: 18/382,436

(22) Filed: Oct. 20, 2023

Related U.S. Application Data

(60) Provisional application No. 63/418,411, filed on Oct. 21, 2022.

(51) Int. Cl.
| | |
|---|---|
| *G01F 17/00* | (2006.01) |
| *G01B 11/28* | (2006.01) |
(Continued)

(52) U.S. Cl.
CPC ............ *G01F 17/00* (2013.01); *G01B 11/285* (2013.01); *G01S 17/04* (2020.01); *G01F 25/0084* (2013.01); *G01S 17/89* (2013.01)

(58) Field of Classification Search
CPC ......... G01B 11/24; G01B 11/00; G01B 11/02; G01B 11/16; G01B 11/14; G01B 11/25;

G01B 9/02; G01B 11/28; G01B 11/06; G01B 5/30; G01B 11/26; G01B 11/22; G01B 11/30; G01B 21/16; G01B 11/04;
(Continued)

(56) References Cited

U.S. PATENT DOCUMENTS

| | | | | |
|---|---|---|---|---|
| 7,421,112 | B2 * | 9/2008 | Calver | .................... G01S 17/89 348/148 |
| 8,047,432 | B2 * | 11/2011 | Breed | ............... B60R 21/01546 235/384 |
(Continued)

FOREIGN PATENT DOCUMENTS

| | | | | | |
|---|---|---|---|---|---|
| CA | | 3005264 | A1 * | 9/2018 | ........... G01F 23/292 |
| CN | | 107209006 | A * | 9/2017 | ............. G01B 11/00 |
(Continued)

*Primary Examiner* — Michael P Stafira
(74) *Attorney, Agent, or Firm* — Price Heneveld LLP

(57) ABSTRACT

The present disclosure generally relates to system and methods for determining the available storage capacity of an enclosed space using visible or near-visible light. A system may utilize one or more light sources and one or more light sensors to sense objects that occupy a physical space. The light sources may be used to produce and radiate light through the space towards the one or more light sensors, which may then measure the intensity of the radiated light received at the sensor. The result of this measurement may be compared against a baseline measurement of the intensity of the received light when the space is completely unoccupied, with the difference between the current measurement and the baseline being proportional to—and with some processing, directly indicates—the amount of the intervening space that is occupied by physical objects.

24 Claims, 11 Drawing Sheets

(51) Int. Cl.

| | | |
|---|---|---|
| *G01S 17/04* | (2020.01) | |
| *G01F 25/00* | (2022.01) | |
| *G01S 17/89* | (2020.01) | |

(58) Field of Classification Search

CPC .......... G01B 15/00; G01B 15/02; G01B 5/00;
G01B 7/16; G01B 11/08; G01B 11/10;
G01B 11/27; G01B 17/08; G01B 21/02;
G01B 21/32; G01B 3/00; G01B 5/02;
G01B 5/28; G01B 7/00; G01B 7/02;
G01B 7/30; G01B 9/00; G01J 5/00; G01J
5/02; G01J 5/10; G01J 5/08; G01J 1/04;
G01J 3/28; G01J 1/44; G01J 3/02; G01J
1/42; G01J 3/36; G01J 3/51; G01J 3/44;
G01J 5/04; G01J 5/60; G01J 3/00; G01J
3/10; G01J 5/48; G01J 1/02; G01J 5/20;
G01J 3/42; G01J 3/50; G01J 5/34; G01J
3/30; G01J 3/46; G01J 4/00; G01J 5/06;
G01J 1/32; G01J 5/12; G01J 1/00; G01J
5/80; G01J 3/06; G01J 3/453; G01J 5/52;
G01J 9/00; G01J 1/08; G01J 1/58; G01J
3/04; G01J 3/45; G01J 5/061; G01J
5/0804; G01J 5/0875; G01J 5/24; G01J
5/28; G01J 9/02; G01J 1/06; G01J 1/10;
G01J 1/28; G01J 3/12; G01J 3/433; G01J
3/443; G01J 5/0805; G01J 5/0831; G01J
5/54; G01J 1/20; G01J 1/46; G01J 1/48;
G01J 3/26; G01J 4/04; G01J 5/0806;
G01J 5/16; G01J 5/70

See application file for complete search history.

(56) References Cited

U.S. PATENT DOCUMENTS

| | | | | |
|---|---|---|---|---|
| 9,062,969 | B1 * | 6/2015 | Degges, Jr. ........... | G01S 7/4915 |
| 2004/0256541 | A1 * | 12/2004 | Cofer ............... | G08B 13/19686 |
| | | | | 250/221 |
| 2010/0073476 | A1 * | 3/2010 | Liang .................... | G06Q 10/08 |
| | | | | 348/136 |
| 2018/0232593 | A1 * | 8/2018 | Tani ........................ | F16P 3/142 |
| 2019/0033433 | A1 * | 1/2019 | Ryu ...................... | H10F 77/953 |
| 2019/0277944 | A1 * | 9/2019 | Ning ..................... | G01S 7/4815 |
| 2019/0340902 | A1 * | 11/2019 | Varjasi ............ | G08B 13/19602 |
| 2020/0011656 | A1 * | 1/2020 | Hornung ................ | G01S 17/88 |
| 2021/0046346 | A1 * | 2/2021 | Fujiwara .............. | G01J 5/0014 |
| 2021/0063574 | A1 * | 3/2021 | Uchimura ............ | G01S 7/4802 |
| 2021/0096257 | A1 * | 4/2021 | Noguchi .............. | G01S 7/4802 |
| 2022/0044430 | A1 * | 2/2022 | Eckman ................ | G01S 7/4817 |
| 2023/0184674 | A1 * | 6/2023 | Chu ........................ | G08B 21/12 |
| | | | | 356/326 |

FOREIGN PATENT DOCUMENTS

| | | | | | |
|---|---|---|---|---|---|
| CN | 111964571 | A | * | 11/2020 | ............... G01B 7/16 |
| DE | 102005056265 | A1 | * | 5/2007 | ............. G01S 7/497 |
| DE | 102006057605 | A1 | * | 6/2008 | ............. F16P 3/142 |
| EP | 3578320 | A1 | * | 12/2019 | ............. H04N 7/181 |
| JP | 2008133085 | A | * | 6/2008 | |
| WO | WO-2004083086 | A1 | * | 9/2004 | ........... G06Q 10/025 |

* cited by examiner

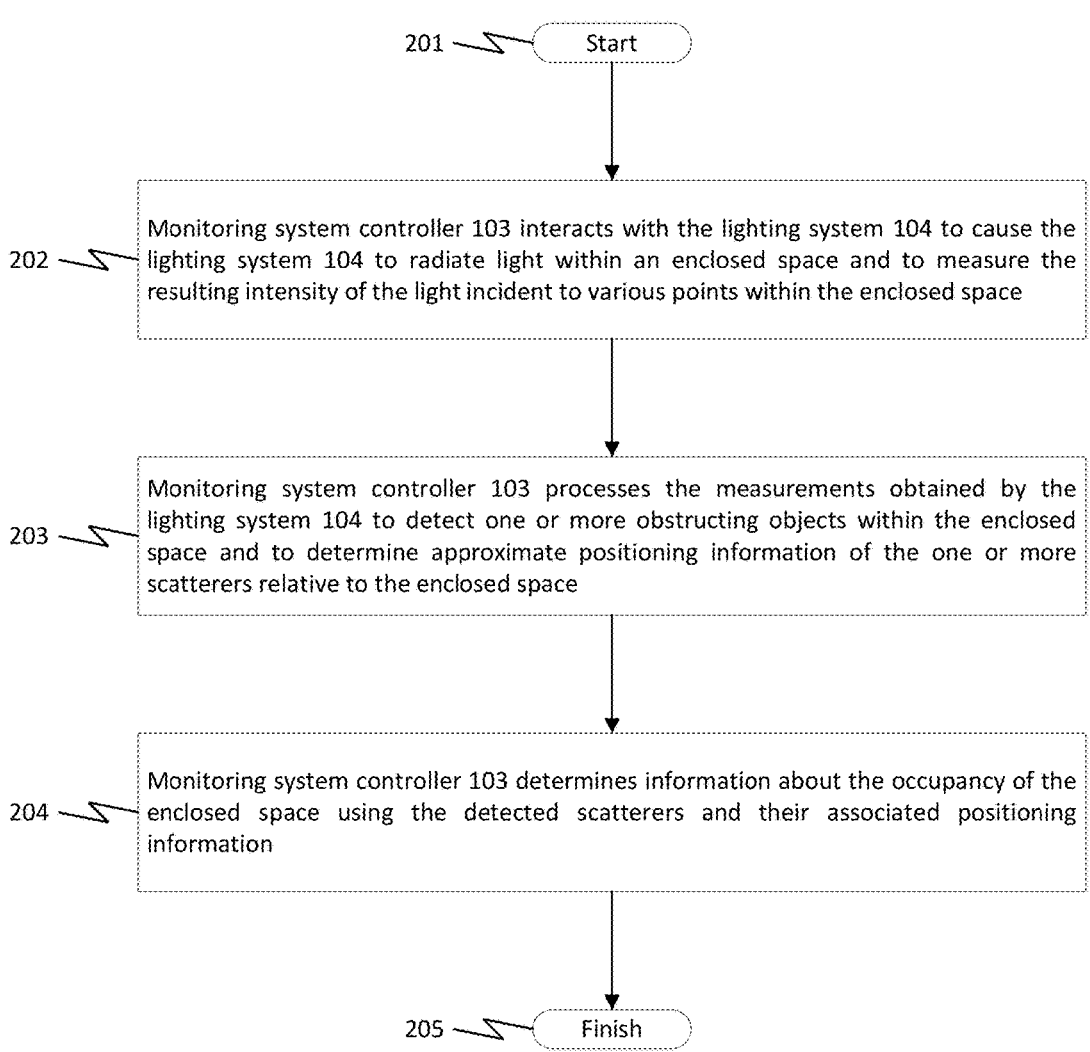

201 — Start

202 — Monitoring system controller 103 interacts with the lighting system 104 to cause the lighting system 104 to radiate light within an enclosed space and to measure the resulting intensity of the light incident to various points within the enclosed space 203 — Monitoring system controller 103 processes the measurements obtained by the lighting system 104 to detect one or more obstructing objects within the enclosed space and to determine approximate positioning information of the one or more scatterers relative to the enclosed space 204 — Monitoring system controller 103 determines information about the occupancy of the enclosed space using the detected scatterers and their associated positioning information 205 — Finish

FIG. 2

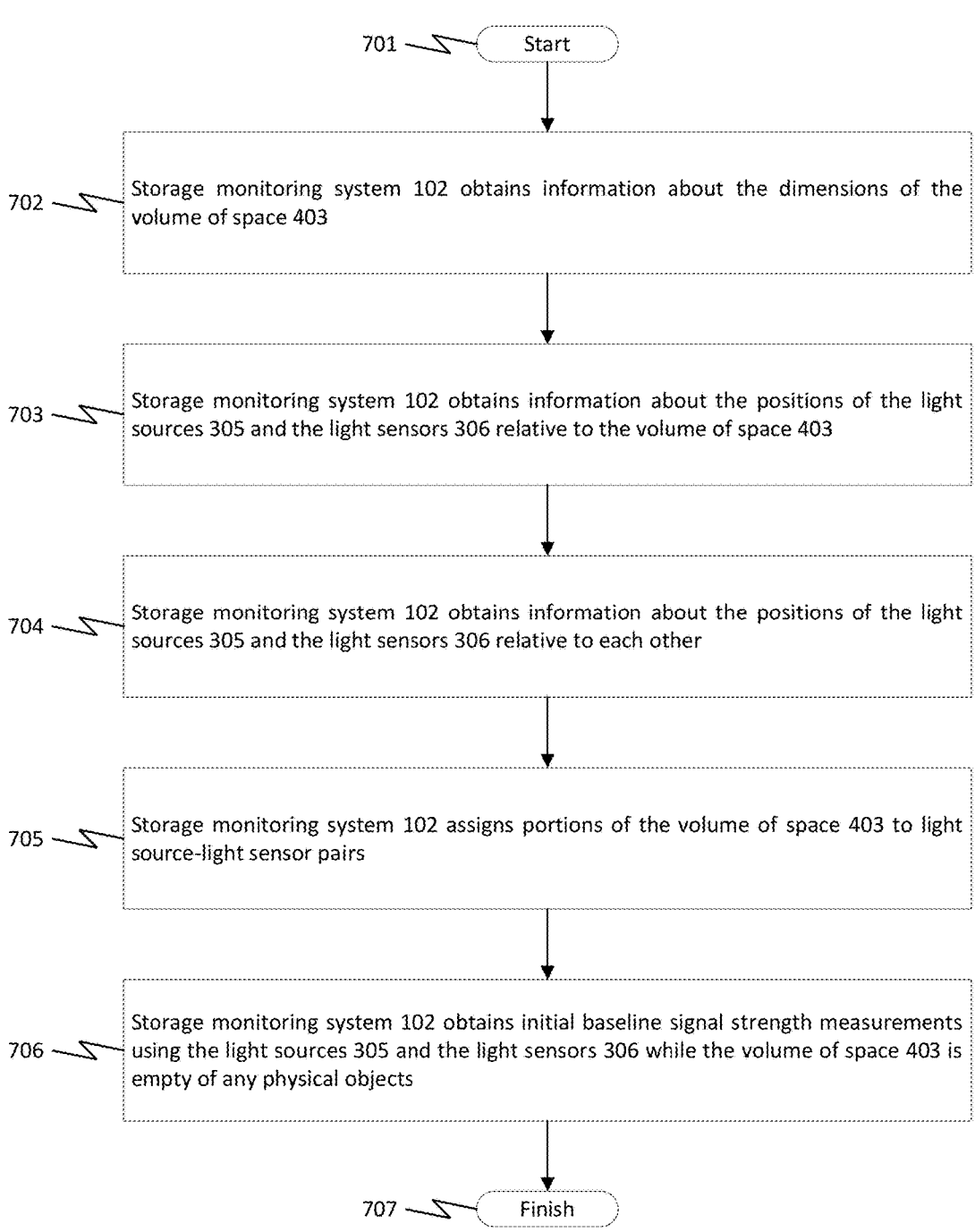

701 — Start

702 — Storage monitoring system 102 obtains information about the dimensions of the volume of space 403

703 — Storage monitoring system 102 obtains information about the positions of the light sources 305 and the light sensors 306 relative to the volume of space 403

704 — Storage monitoring system 102 obtains information about the positions of the light sources 305 and the light sensors 306 relative to each other 705 — Storage monitoring system 102 assigns portions of the volume of space 403 to light source-light sensor pairs 706 — Storage monitoring system 102 obtains initial baseline signal strength measurements using the light sources 305 and the light sensors 306 while the volume of space 403 is empty of any physical objects 707 — Finish

FIG. 7

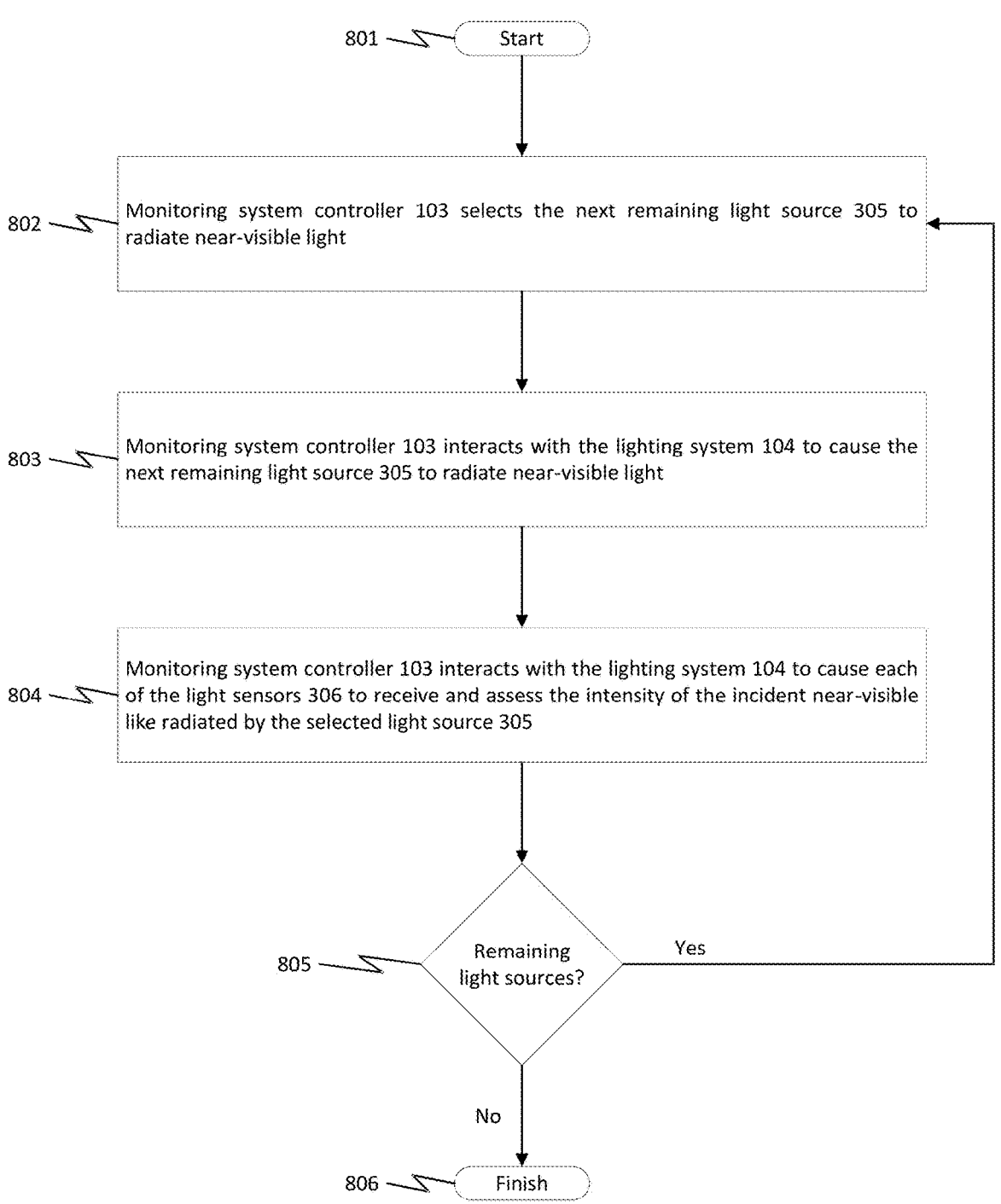

801 —⚡ ( Start )

802 —⚡ Monitoring system controller 103 selects the next remaining light source 305 to radiate near-visible light 803 —⚡ Monitoring system controller 103 interacts with the lighting system 104 to cause the next remaining light source 305 to radiate near-visible light 804 —⚡ Monitoring system controller 103 interacts with the lighting system 104 to cause each of the light sensors 306 to receive and assess the intensity of the incident near-visible like radiated by the selected light source 305

805 —⚡ Remaining light sources?     Yes

No

806 —⚡ ( Finish )

FIG. 8

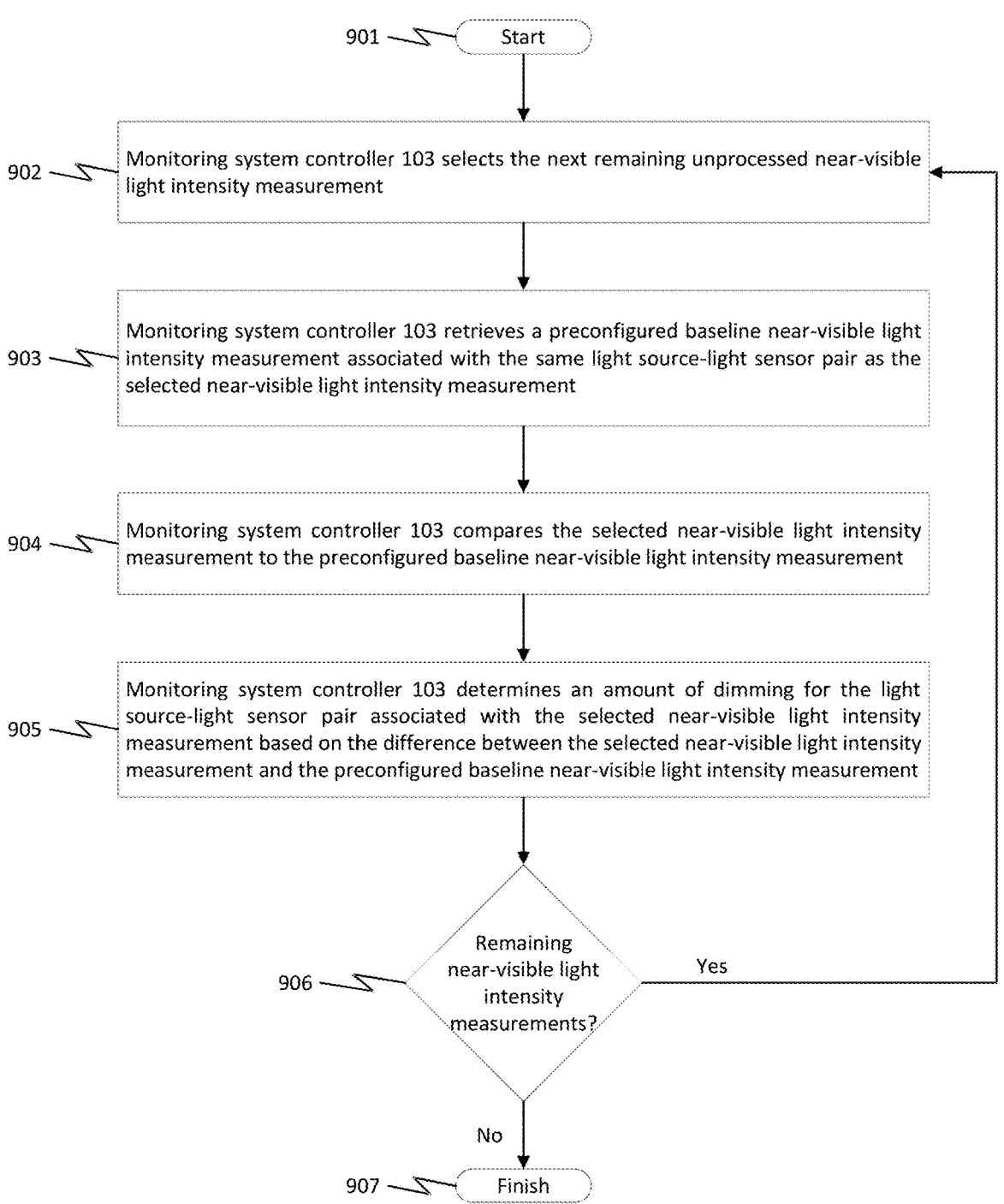

901 — Start

902 — Monitoring system controller 103 selects the next remaining unprocessed near-visible light intensity measurement 903 — Monitoring system controller 103 retrieves a preconfigured baseline near-visible light intensity measurement associated with the same light source-light sensor pair as the selected near-visible light intensity measurement 904 — Monitoring system controller 103 compares the selected near-visible light intensity measurement to the preconfigured baseline near-visible light intensity measurement 905 — Monitoring system controller 103 determines an amount of dimming for the light source-light sensor pair associated with the selected near-visible light intensity measurement based on the difference between the selected near-visible light intensity measurement and the preconfigured baseline near-visible light intensity measurement 906 — Remaining near-visible light intensity measurements?          Yes No 907 — Finish

FIG. 9

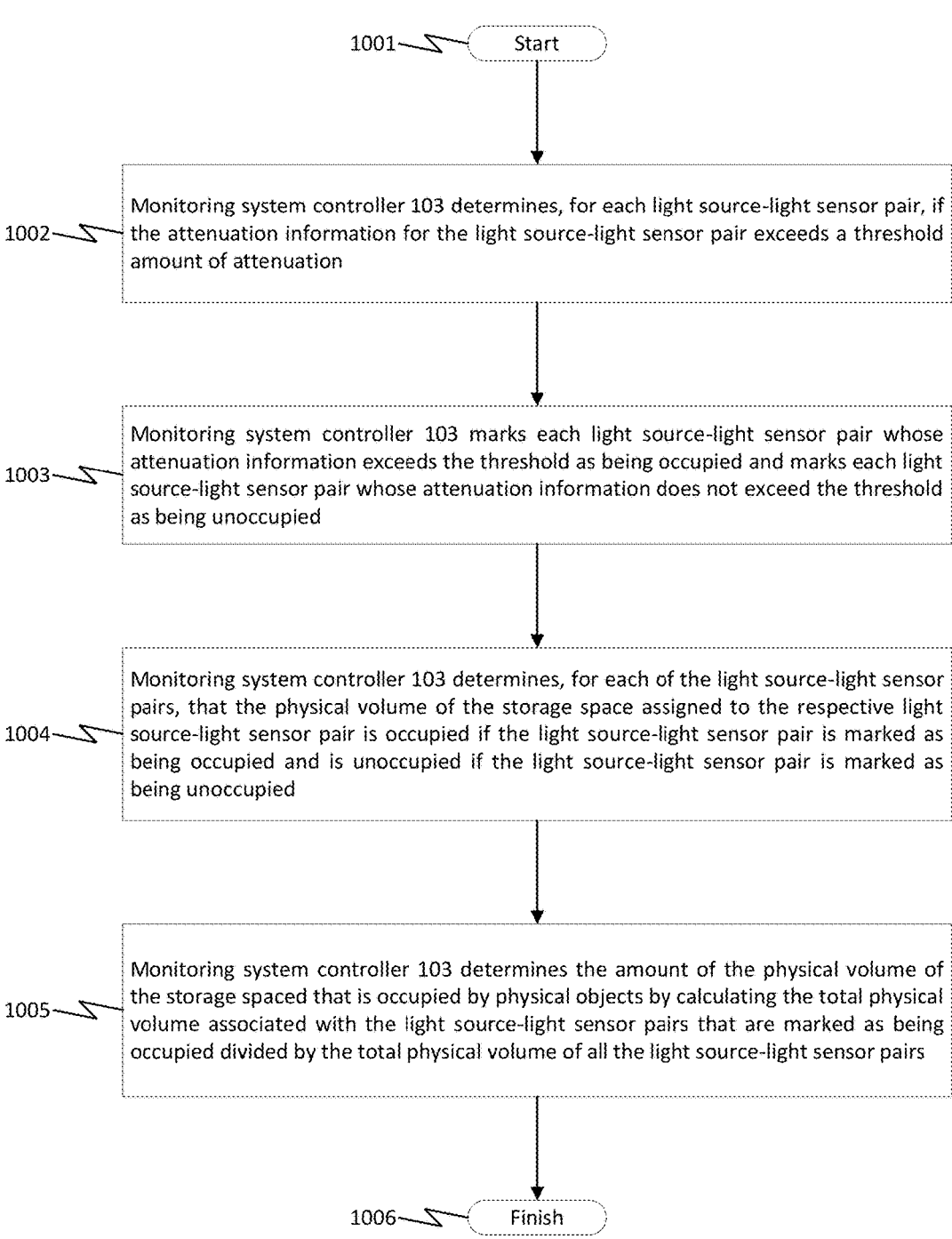

1001 — Start

1002 — Monitoring system controller 103 determines, for each light source-light sensor pair, if the attenuation information for the light source-light sensor pair exceeds a threshold amount of attenuation 1003 — Monitoring system controller 103 marks each light source-light sensor pair whose attenuation information exceeds the threshold as being occupied and marks each light source-light sensor pair whose attenuation information does not exceed the threshold as being unoccupied 1004 — Monitoring system controller 103 determines, for each of the light source-light sensor pairs, that the physical volume of the storage space assigned to the respective light source-light sensor pair is occupied if the light source-light sensor pair is marked as being occupied and is unoccupied if the light source-light sensor pair is marked as being unoccupied 1005 — Monitoring system controller 103 determines the amount of the physical volume of the storage spaced that is occupied by physical objects by calculating the total physical volume associated with the light source-light sensor pairs that are marked as being occupied divided by the total physical volume of all the light source-light sensor pairs 1006 — Finish

FIG. 10

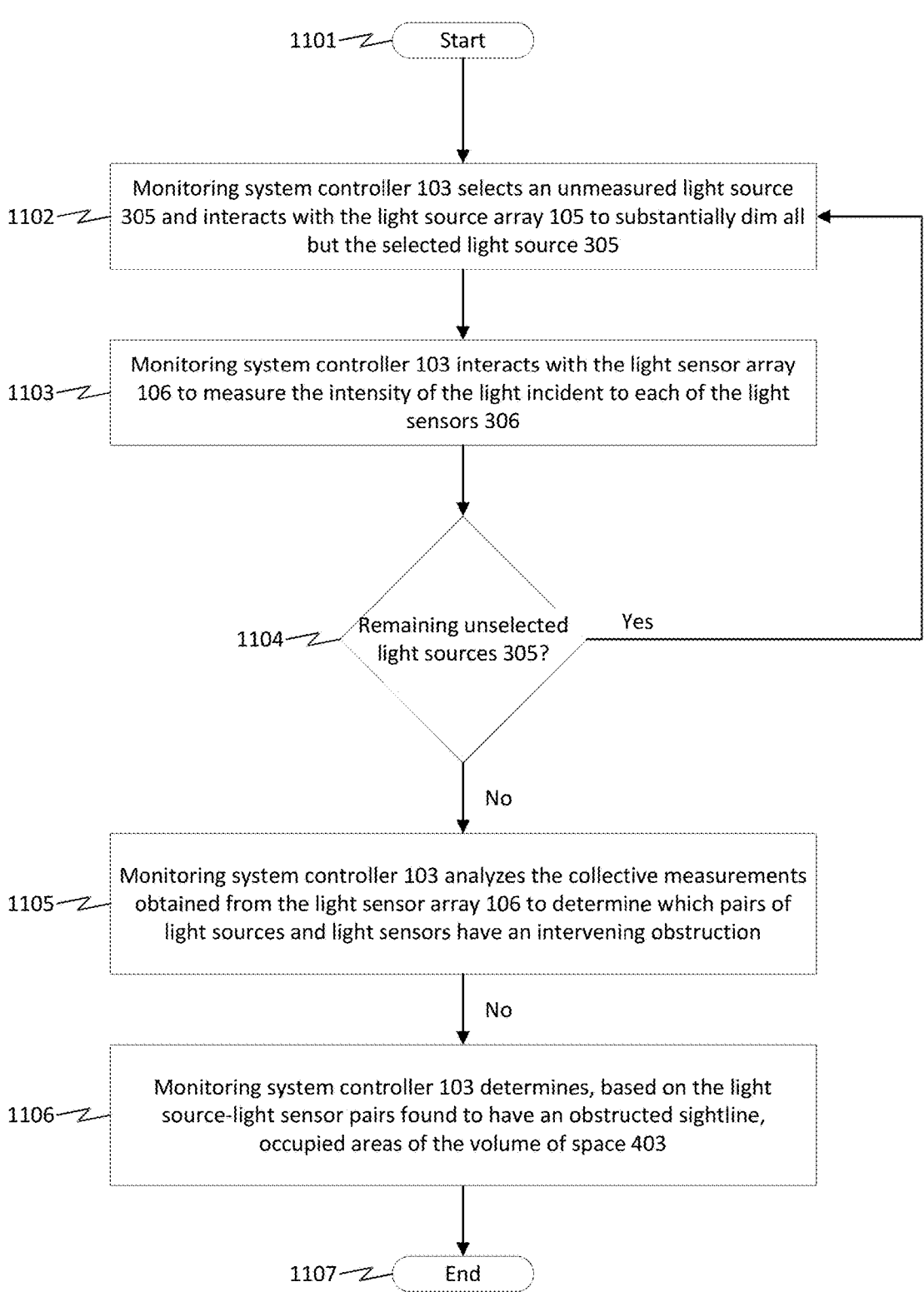

1101 — Start

1102 — Monitoring system controller 103 selects an unmeasured light source 305 and interacts with the light source array 105 to substantially dim all but the selected light source 305

1103 — Monitoring system controller 103 interacts with the light sensor array 106 to measure the intensity of the light incident to each of the light sensors 306

1104 — Remaining unselected light sources 305?

Yes

No

1105 — Monitoring system controller 103 analyzes the collective measurements obtained from the light sensor array 106 to determine which pairs of light sources and light sensors have an intervening obstruction No 1106 — Monitoring system controller 103 determines, based on the light source-light sensor pairs found to have an obstructed sightline, occupied areas of the volume of space 403

1107 — End

FIG. 11

METHODS AND SYSTEMS FOR DETERMINING THE AVAILABLE STORAGE CAPACITY OF AN ENCLOSED SPACE

CROSS-REFERENCE TO RELATED APPLICATIONS

This application claims priority to U.S. Provisional Patent Application No. 63/418,411, filed on Oct. 21, 2022, which is incorporated herein by reference in its entirety.

BACKGROUND

Technical Field

The present disclosure generally relates to determining the available storage capacity of an enclosed space, and more particularly, methods, systems, apparatuses, and non-transitory computer readable media for determining the available storage capacity of an enclosed space using visible or near-visible light.

Description of the Background

An important task for many businesses is monitoring items that they are currently storing. This is often especially true for businesses heavily involved in the movement and transportation of various goods, where efficient and effective use of the storage spaces of a fleet of transportation vehicles is particularly desirable. In this regard, the efficiency of the space utilization heavily impacts the operating costs associated with shipping operations. Underutilization of a vehicle's cargo capacity means less goods transported per trip (from the distribution point(s) to various destinations), thereby requiring more trips and significantly increasing costs.

Existing solutions for cargo monitoring are often inaccurate, costly, and/or require significant maintenance. Thus, more effective cargo monitoring systems capable of being implemented and maintained at a relatively low cost are greatly desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2 is a flowchart of an exemplary method of assessing the occupancy of an enclosed space using light.

FIG. 7 is a flowchart of an exemplary method of configuring a storage monitoring system.

FIG. 8 is a flowchart of an exemplary method of radiating and measuring intensities of near-visible light, such as was described in FIG. 2.

FIG. 9 is a flowchart of an exemplary method of determining approximate positioning information, such as was described in FIG. 2.

FIG. 10 is a flowchart of an exemplary method of determining information about the occupancy of an enclosed space using approximate positioning information, such as was described in FIG. 2.

FIG. 11 is a flowchart of an exemplary method of assessing the occupancy of an enclosed space using light.

DETAILED DESCRIPTION

Figure 1:
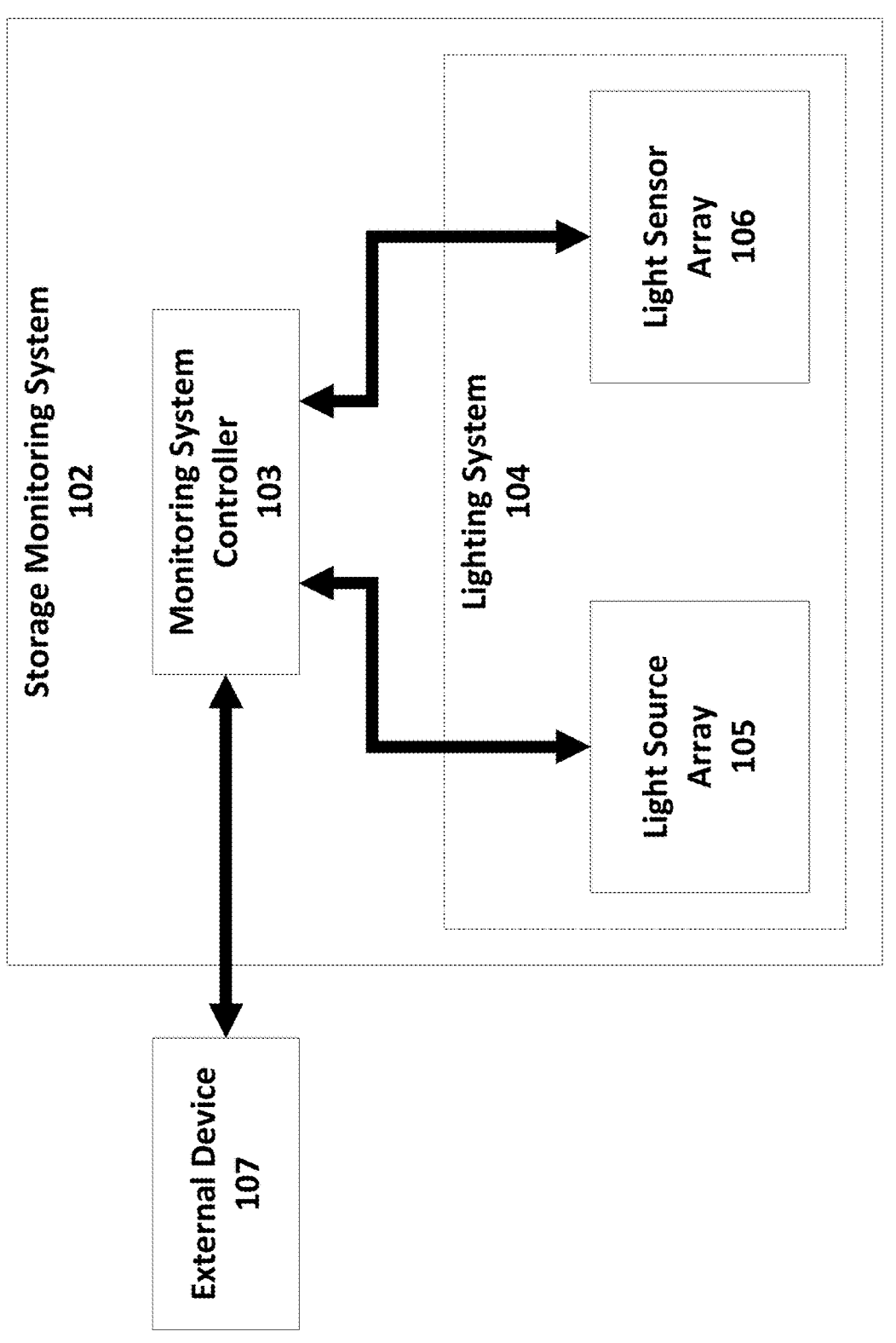
FIG. 1 shows a block diagram of a storage monitoring system in accordance with an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

At a high-level, embodiments of the present disclosure may determine the available storage capacity of a certain space (i.e., three-dimensional volume) by measuring what amount of that space is occupied by physical objects. A system in accordance with some embodiments of the present disclosure may utilize one or more light sources and one or more light sensors to sense objects that occupy a physical space. The light sources may be used to produce and radiate light through the space towards the one or more light sensors, which may then measure the intensity of the radiated light received at the sensor. The result of this measurement may be compared against a baseline measurement of the intensity of the received light when the space is completely unoccupied, with the difference between the current measurement and the baseline indicating if there is an intervening object.

At a high-level, embodiments of the present disclosure may determine the available storage capacity of a certain space (i.e., three-dimensional volume) by measuring what amount of that space is occupied by physical objects. In turn, to measure what percentage of space is occupied, embodiments of the present disclosure may utilize one or more light sources and one or more light sensors. The light sources may be used to radiate near-visible light through the space towards the one or more light sensors, which may then measure the intensity of the incident near-visible light. The result of this measurement may be compared against a baseline measurement of the intensity of the incident light when the space is completely unoccupied.

Transportation and storage of goods play a key role in modern-day society. Modern day supply chains and transportations networks are often quite complex, with a given shipment being transferred between vehicles and warehouses multiple times between its origin and destination. Because of the high throughput of goods between various vehicles and storage areas (e.g., warehouses), an important aspect of the shipping process is keeping track of what—in the general sense of occupying volume—is currently stored in a vehicle's cargo area or in a warehouse's storage area.

One reason keeping track of what is currently stored within a vehicle's cargo area or warehouse's storage area is useful is that the high throughput of goods entering and leaving a warehouse may sometimes lead to mistakes or errors in the loading or unloading process. For instance, for goods being delivered to a warehouse on a semi-trailer, it may often be the case that the entirety of the contents of the semi-trailer is being delivered. It is possible, however, that through miscommunication or similar type of error, the tractor-trailer may only partially (or even not at all) unloaded before it is prompted to depart. This is obviously an undesirable outcome, and the ability to determine the occupancy of a tractor-trailer could potentially prevent this outcome. In a similar example, for goods being placed onto a semi-trailer for transport, it may often be the case that most of the space within the tractor-trailer is typically used. It is possible, however, that through miscommunication, the tractor-trailer is only partially loaded before it is prompted to depart. Like before, this is an undesirable outcome, and the ability to determine the occupancy of a tractor-trailer could potentially prevent this outcome.

Another type of example, a tractor-trailer, after being loaded, could be temporarily held at the loading center (e.g., a warehouse). For instance, if there are no available drivers and/or tractor units that can haul the tractor-trailer. In this case, the tractor-trailer may be allowed to remain at the loading bay or may be temporarily moved to a holding area. In either case, through miscommunication or a similar type of error, the trailer may be overlooked and allowed to remain even after a tractor unit becomes available (or whatever reason the tractor-trailer was being held for expires). Unnecessarily delaying the transportation of goods is often undesirable, and the ability to detect that a tractor-trailer is occupied (but not moving) may potentially be used to prevent this outcome. As a related example, goods being held at a warehouse may, for some reason, be overlooked and allowed to remain for an unnecessarily long amount of time. The ability to determine the occupancy of various portions of a warehouse may potentially be utilized to detect that the goods occupying an area has been unchanging for a certain amount of time, potentially preventing this outcome.

One reason keeping track of what is currently stored within a vehicle's cargo area or warehouse's storage area is useful is to improve the efficiency of the shipping process. At a high-level, this may be summarized as trying to deliver the most packages in the least amount of time using the least number of trips. Note, however, that this does ignore certain nuances, such as the desire to ensure that all packages are delivered within a certain amount of time. It also ignores that, in certain cases, there may be trade-offs between delivering goods in the least number of trips and delivering goods in the least amount of time. Nevertheless, improvements in efficiency that decrease the number of necessary trips also may generally be used to decrease the necessary amount of time, and vice-versa.

As a simple but relevant detail, note that the physical capacity of a vehicle's storage area (often called a cargo hold, in this context) is limited. Thus, the ability of a vehicle to transport cargo is limited to packages or other goods with physical dimensions that allow them to collectively fit within the storage area. Also note that vehicles, as physical objects, must travel from their current location (wherever it may be) to a pickup point before cargo can be loaded onto the vehicle. As a final detail, note that some deliveries involve moving only cargo between a single pickup point and a single destination—referred to as less than truckload (LTL) shipping—and some deliveries may involve picking up cargo from multiple pickup points and/or delivering cargo to multiple destinations—referred to as full truckload (FTL) shipping.

For FTL shipping, it is important to know what portion of a vehicle's storage area is being utilized in order to determine if the vehicle is able to pick up additional goods from a destination. Complicating this problem, however, is that the portion of a vehicle's storage area that is being utilized may change as goods are dropped off at various destinations. Thus, the ability to determine in real-time (or near real-time) are greatly desired.

To resolve these issues, embodiments of the present disclosure may utilize electromagnetic radiation in the form of near-visible light (i.e., infrared light, visible light, and ultraviolet light) to evaluate the current storage capacity of an enclosed space. At a high-level, embodiments of the present disclosure may utilize a plurality of light sources and light sensors to radiate and measure (the intensity of) near-visible light. The measured intensities of the near-visible light may then be compared to expected baseline measurements. Because near-visible light largely passes through the unenclosed spaced unimpeded, if the measured intensity of the near-visible light is less than the expected baseline measurement by more than a threshold amount, the existence of a physical object between the light source and light sensor pair may be inferred. Multiple light source and light sensor pairs may be used to infer—to a resolution partially determined by the number of light sources and light sensors—what portions of the enclosed space are occupied and what portions are not occupied.

FIG. 1 shows a block diagram of a storage monitoring system in accordance with an exemplary embodiment of the present disclosure. As shown by the figure, a storage monitoring system 102 may comprise a monitoring system controller 103 and a lighting system 104. The lighting system 104 may comprise a light source array 105 and a light sensor array 106. In general, the light source array 105 may comprise one or more light sources and the light sensor array 106 may comprise one or more light sensors. The monitoring system controller 103 is connected to the light source array 105 and may use the light sources of the light source array 105 to produce and shine light (of potentially varying wavelengths, e.g., between 380 nanometers (nm) to 750 nm if visible light is being used or between 750 nm to 1 millimeter (mm) if infrared light is being used). Similarly, the monitoring system controller 103 is connected to the light sensor array 106 and may use the light sensors of the light sensor array 106 to receive and record the brightness of the light received.

The monitoring system controller 103 may also be connected to one or more external devices 107 which, among other things, may allow the monitoring system controller 103 to report information about utilization of the space between the light sources and the light sensors, such as the relative dimming and an assessed amount of material stored in the space. As an example, the external devices 107 may include a display device that displays the reported information to a user. For example, the external device 107 may comprise one or more computer systems, such as smartphones, laptop or desktop computers, or other devices that are configured to process and display information to users.

As will be described in more detail below, the monitoring system controller 103 is generally configured to control the operation of the storage monitoring system 102. The monitoring system controller 103 may be implemented in hardware or a combination of hardware with software or firmware. In some embodiments, the monitoring system controller 103 comprises at least one processor configured to execute instructions stored in memory for performing at least some of the functionality ascribed to the monitoring system controller 103.

At a high level, a basic way that the storage monitoring system 102 may measure the amount of occupied (or, equivalently, unoccupied) space in a given volume is to generate light from one or more light sources and determine if there are any shadows being (unexpectedly) cast using the one or more light sensors. In other words, for each possible pair of light source and light sensor, if there is a clear line of sight allowing light from the light source to directly radiate onto the light sensor, a sufficiently sensitive light sensor can detect a difference in measured radiant flux (e.g., illuminance) when light from the light source is being received compared to when light from such source is not being received or is being at least partially blocked (e.g., the light source is off or some non-transparent object is between the path from the light source to the light sensor). By measuring the amount of light received for a given light sensor from a given light source when the space is unoccupied (and thus the line of sight between the light source and light sensor is unobstructed), a baseline measurement of measured intensity may be established for that pair.

FIG. 2 is a flowchart illustrating a process of assessing the occupancy of an enclosed space using a storage monitoring system, such as the storage monitoring system 102. To start, as shown by block 202 of FIG. 2, the monitoring system controller 103 interacts with the lighting system 104 to cause the lighting system 104 to radiate light within an enclosed space and to then measure the resulting intensity of light incident to various points within the enclosed space. As described in more detail below (e.g., in FIG. 8).

After the lighting system 104 generates and measures the near-visible light within the enclosed space, as shown by block 203 of FIG. 2, the monitoring system controller 103 mat process the measurements obtained by the lighting system 104 to detect one or more obstructing objects and to determine approximate positioning information for the one or more detected obstructing objects relative to the enclosed space.

After the monitoring system controller 103 detects and determines approximate positioning information for the one or more obstructing objects, as shown by block 204 of FIG. 2, the monitoring system controller 103 determines information about the occupancy of the enclosed space using the detected scatterers and their associated approximate positioning information.

To evaluate the current storage capacity of the volume being monitored, the same measurement may be repeated for each light source-light sensor pair. By comparing the current measurements to the pre-determined baseline, it may be determined, for each light source-light sensor pair, if the path between light source and light sensor is (at least partially) occluded by some object. This information about the occlusion or non-occlusion of the line-of-sight path between each light source-light sensor pair may then be processed to determine, given the known geometry of the light sources and light sensors, which portions of the monitored space are (likely) occupied.

Figure 3:
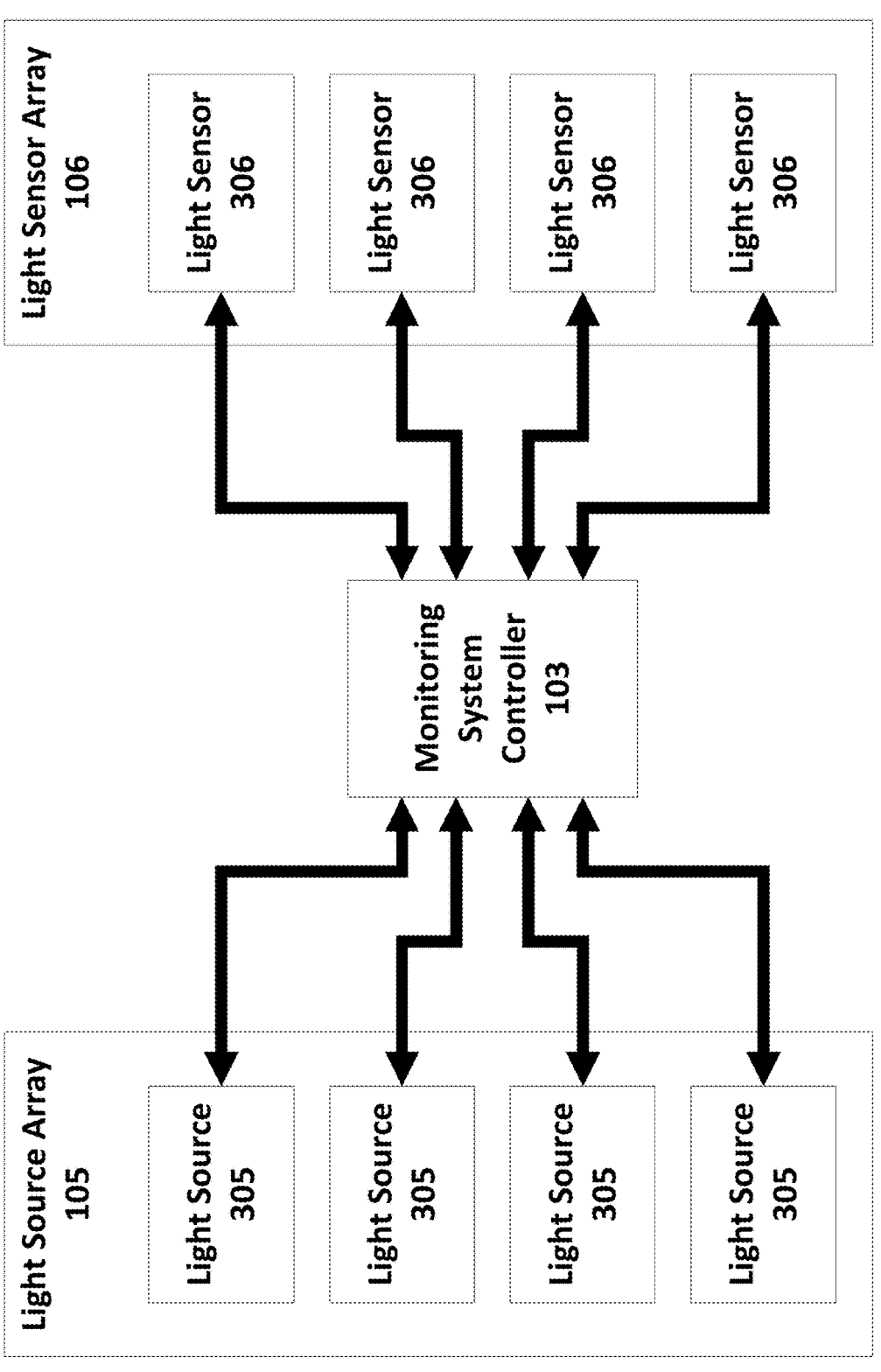
FIG. 3 shows a block diagram of a lighting system, such as is shown in FIG. 1.

FIG. 3 shows a block diagram of a lighting system 104, such as is shown in FIG. 1. As shown by the figure, the lighting system 104 comprises the light source array 105 and the light sensor array 106. In general, the light source array 105 comprises one or more light sources 304 (e.g., light emitting diodes (LEDs) or other types of known light sources). Similarly, the light sensor array 106 comprises one or more light sensors 305. The light source array 105 and the light sensor array 106 may be connected to the monitoring system controller 103, and the light sources 304 and light sensors 305 may be collectively positioned such that space to be monitored (e.g., a storage space for storing objects during shipment) is between the light sources 304 and the light sensors 305.

Note that, in general, a storage monitoring system may comprise only a single light source 304 and/or a single light sensor 305. Having more than one light source 304 and light sensor 305 may help to increase the resolution at which the contents of a monitored volume of space may be assessed.

Also note that, in some embodiments the lighting system 104 may utilize visible light (i.e., may utilize light sources 304 that produce light in the visible spectrum and utilize light sensors sensitive to light in the visible spectrum). In other embodiments the lighting system 104 may utilize near-visible light, such as infrared light (i.e., may utilize light sources 304 that produce light in the infrared spectrum and utilize light sensors sensitive to light in the infrared spectrum). One advantage of using a visible light-based lighting system 104 is that they light sources 304 may also serve as the functional lighting for the monitored space (e.g., may illuminate the space for human use). One advantage of using an infrared light-based lighting system 104 is that infrared light may be somewhat resistant to being affected by (e.g., partially able to pass through unobstructed) dust or similar types of debris while still maintaining (at the length-scale of interest) the ray-like propagation associated with visible light.

Figure 4:
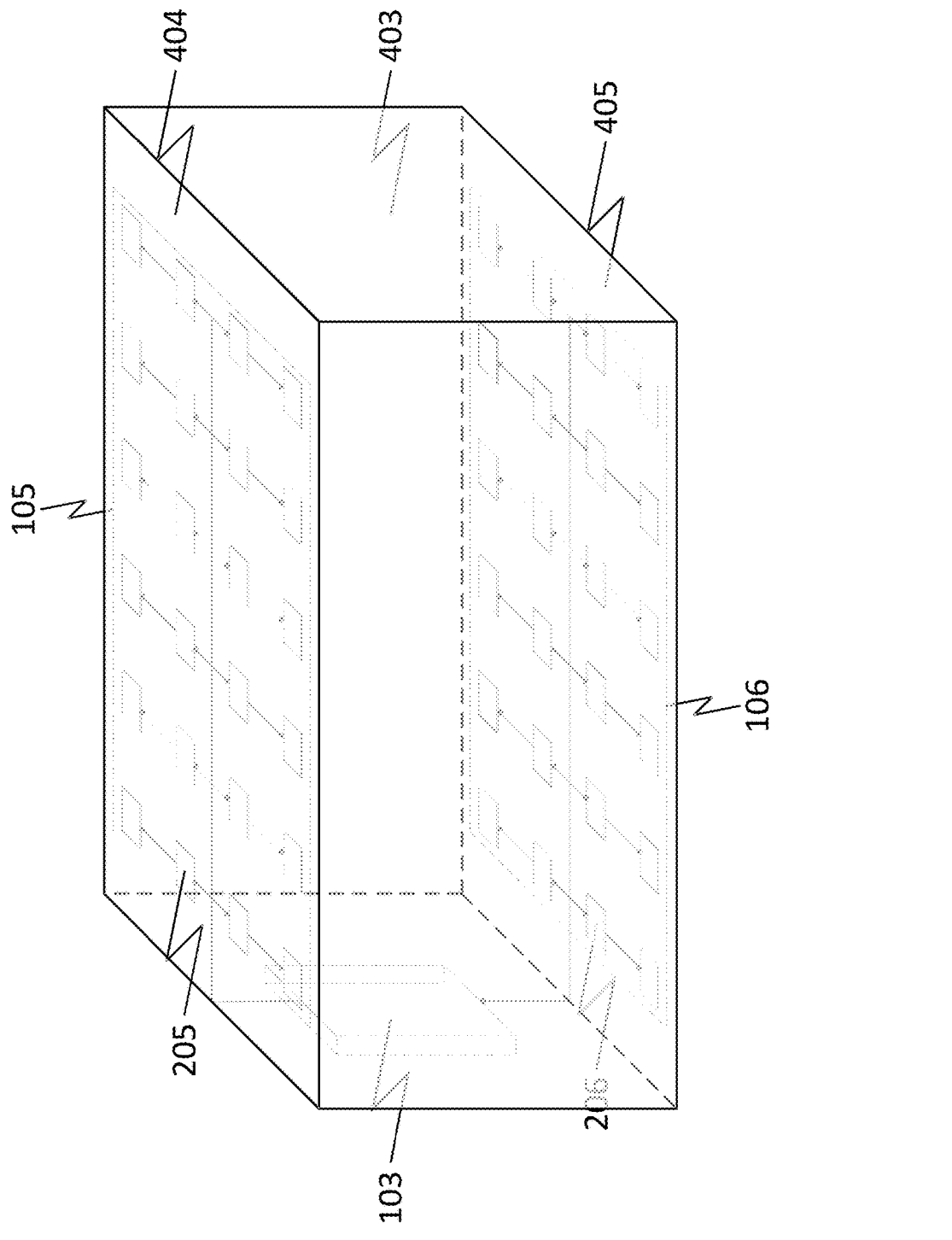
FIG. 4 shows a schematic of a storage area utilizing a storage monitoring system.

FIG. 4 shows a schematic of storage area utilizing a storage monitoring system to monitor and assess the contents of an enclosed space. Specifically, as shown by the figure, a volume of space 403 may be defined. Along a surface 404 of this space are several light sources 304—shown here on the "top" or "ceiling" of the space. Along another surface 405 of this spare are several light sensors 305—shown here on the "bottom" or "floor" of the space. Because of their relative orientation—here, being opposed to one another—the volume of space 403 is between the various light source-light sensor pairs. Thus, the light produced by the various light sources 304 will propagate through the volume of space 403 where it may be partially or fully reflected or absorbed by intervening objects. Any non-disrupted light may be received and measured by the various light sensors 305.

In operation, a storage monitoring system 102, such as the system depicted in FIG. 4, may involve the monitoring system controller 103 controlling the light source array 105 such that at least one of the light sources 304 are generating light. As the light arrives at one or more light sensors 305, the intensity (e.g., brightness) of the light is sampled by the light sensors 305 that receive it, and the samples are transmitted to the monitoring system controller 103 for analysis. The generation and sampling may be repeated multiple times, so that an ensemble of measurement samples is received. The monitoring system controller 103 may then determine the difference between the received and transmitted intensity of the light and compare this to a predefined (e.g., stored) baseline difference. The stored baseline difference indicates the expected difference between transmitted and received light when the volume of space 403 is entirely or almost entirely unoccupied or, in other words, is substantially empty (e.g., occupied only or almost only by air).

The difference between the received intensity of light and the expected baseline may then be attributed to the presence of objects in the volume of space 403 and may be used to calculate the amount of volume that is occupied.

Figure 5:
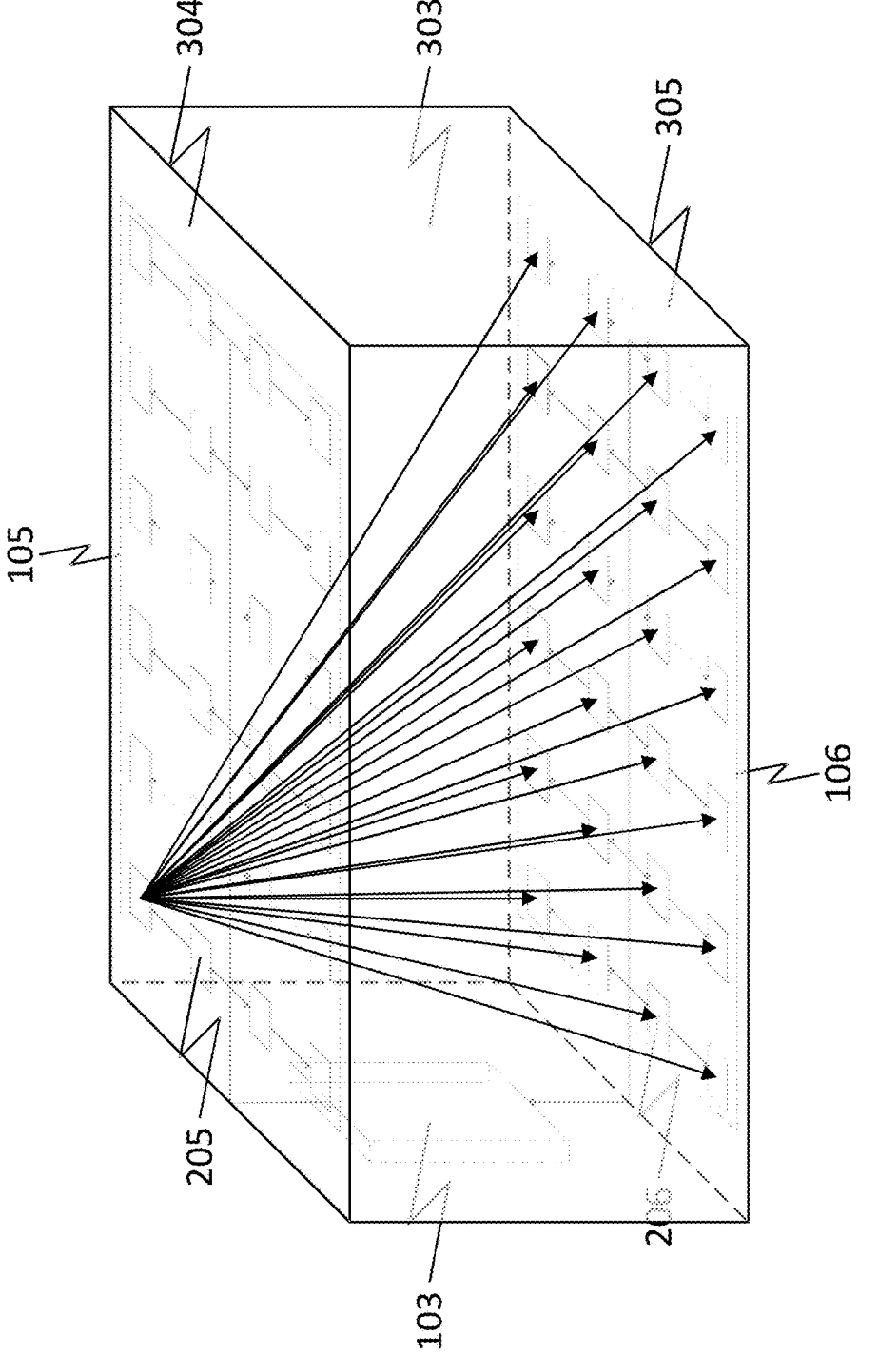
FIG. 5 shows a second schematic of the storage area and storage monitoring system shown in FIG. 4.

More precisely, the difference between the receive intensity of light and the expected baseline, for a given light source-light sensor pair, may be attributed to the presence of an object somewhere along the path between the light source and light sensor. FIG. 5 illustrates exemplary light rays between one light source and all light sensors for the configuration of the light source array and light sensor array shown in FIG. 4. In other words, FIG. 5 illustrates the line-of-sight paths for all the light source-light sensor pairs resulting from the combination of the one light source with each of the light sensors.

Note that the manner of placement of the lighting system 104 shown in FIG. 4—i.e., of the light sources along the ceiling and the light sensors along the floor—is exemplary only. In other embodiments, the lighting system 104 may be placed differently. For example, in some embodiments the positions of the light sources 304 and the light sensors 305 may be reversed from that shown in FIG. 4, so that the light sources 304 are on the "floor" and the light sensors 305 are on the "ceiling." As another example, in some embodiments the light sources and light sensors may be "mixed," so that both light sources and light sensors are present on a given surface. In the context of the example shown by FIG. 4, this could involve having both light sources and light sensors on the ceiling 404 and/or involve having both light sources and light sensors on the floor 405.

Additionally, in some embodiments, light sources and sensors may be placed on the walls or other locations without being placed on the ceiling and/or floor. For example, in some embodiments the light sensors 305 may be placed onto one or more of the "walls" of the volume of space being monitored, either in lieu of or in addition to having light sensors 305 placed on the "floor." Similarly, in some embodiments the light sources 304 may be placed onto one or more of the "walls" of the volume of space being monitored, either in lieu of or in addition to having light sources 304 placed on the "floor." In general, the effect of including additional light sources and/or light sensors—such as by increasing the number of light sources 304 placed on the ceiling or by adding additional light sensors 305 along one or more walls—may be to increase the resolution of space effectively resolvable by the storage monitoring system. Broadly stated, this increased resolution may be thought of as arising from the additional line-of-sight paths between an additional light source and the collective light sensors or between the collective light sources to an additional light sensor. In effect, these additional line-of-sight paths further divide the space being monitored, reducing the uncertainty as to how far a detected object extends past the lines-of-sight that it is obstructing.

Figure 6:
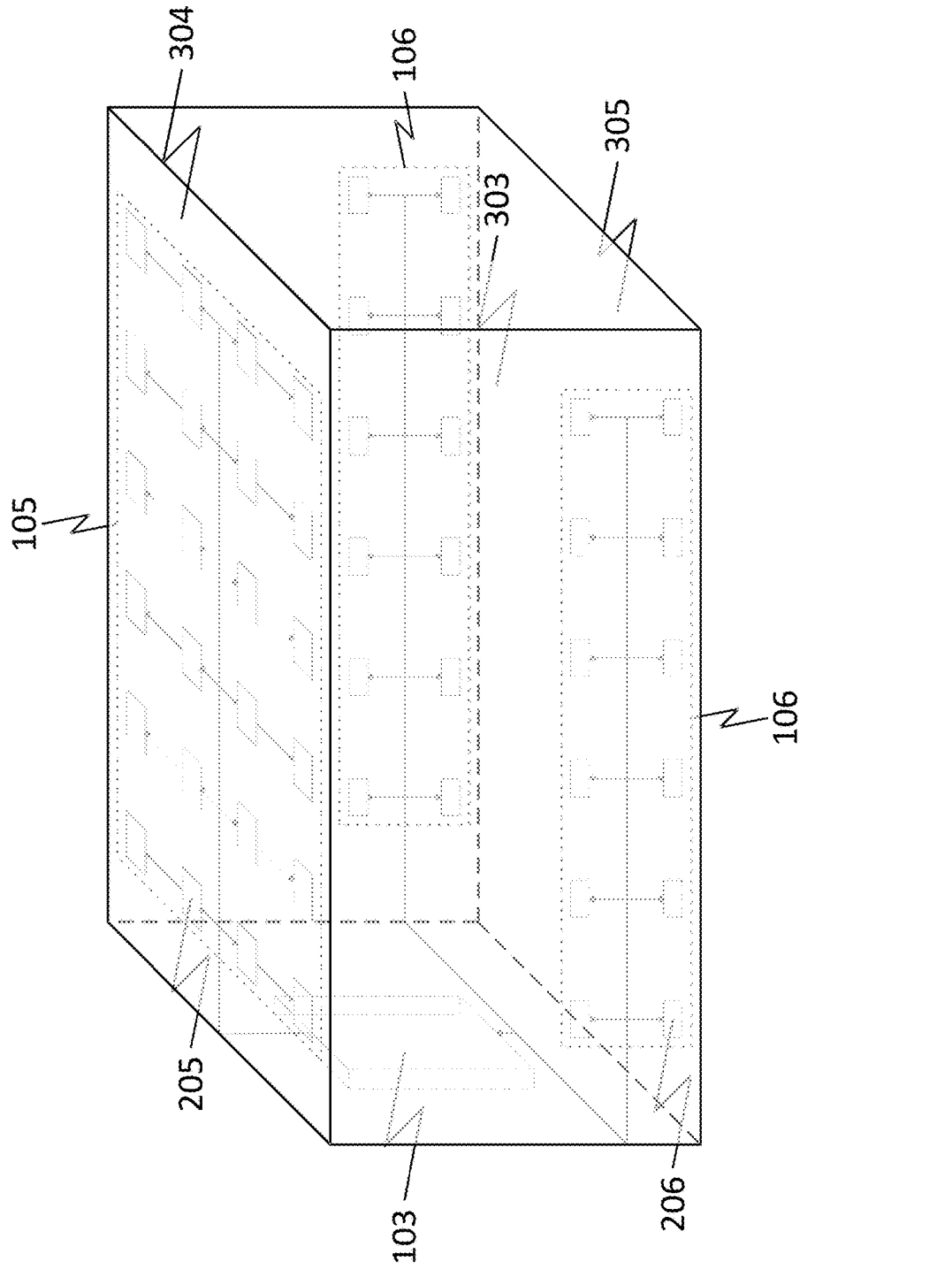
FIG. 6 shows a schematic of the storage area shown in FIG. 4 utilizing a storage monitoring system with an alternative lighting system placement.

In some applications, embodiments that do not involve placing parts of the lighting system 104 along the "floor" of the monitored volume of space may be preferred. For example, some applications—such as cargo trailers—may prefer a lighting system placement that has the light sources 304 distributed across the "ceiling" of the space being monitored and has the light sensors 305 distributed across one or more "walls" of the space being monitored. FIG. 6 shows a schematic of storage area utilizing the storage monitoring system 102 with the lighting system placement just described. In some of these embodiments, additional light sources 304 may also be placed along one or more of the walls. Similarly, in some of these embodiments, additional light sensors may also be placed along the ceiling.

One reason some applications may prefer lighting system placements that avoid placing light sources or light sensors on the floor of the space is to avoid or reduce the risk of damaging the light sources or sensors. For example, in the context of a cargo trailer, cargo is frequently moved in and out, subjecting floor-placed things to a high degree of wear and tear, especially from heavy cargo. Another reason for preferring lighting system placements that avoid using the floor is that dust and dirt naturally accumulate along the floor of a space, which could obscure lighting sources and lighting sensors placed there. This could degrade the performance of the storage monitoring system, with obscured lighting sources leading to false negatives (i.e., determining an occupied space is unoccupied) and obscured lighting sensors leading to false positives (i.e., determining an unoccupied space is occupied).

Based on differences between the received intensity of light and the expected baseline, the monitoring system controller 103 may be configured to determine one or more parameters indicative of the utilization of the space 403. As an example, based on such difference, the monitoring system controller 103 may be configured to estimate or otherwise determine a value indicating an amount of the space 403 that is occupied by physical objects. For example, the value may indicate a percentage of the space that is occupied by physical objects, although other values (e.g., a measurement of cubic inches or feet) may be determined in other examples. In some embodiments, the controller 103 is configured to transmit such parameter to an external device 107, which then displays the parameter or information based on such parameter (e.g., a graphical element) to a user. In some embodiments, the controller 103 may be configured to compare the parameter to a threshold and transmit information indicative of the comparison. As an example, the threshold may correspond to a utilization goal for the space, and the transmitted information may indicate whether such goal is satisfied by indicating whether the threshold is exceeded (e.g., whether the percentage of utilization is above a desired threshold). In other embodiments, yet other types of information may be reported based on the measurements of the light illuminating the light sensors 305.

Note that, in some embodiments, the monitoring system controller 103 may perform more complex analysis of the measurements obtained from the light sensor array 106 to improve the accuracy or resolution of the monitoring system 102. For example, one possible source of noise is indirect illumination. Where direct illumination refers to receiving light cast directly from a light source along a direct, straight-line path, indirect illumination refers to receiving light cast indirectly from a light source along a possible bent (e.g., refracted) or angled (e.g., reflected) path. For example, a light sensor 305 could be indirectly illuminated by a light source 304 when an object within the volume of space 403 reflects light from the light sensor 305 towards the light source 304.

Indirect illumination may act as a source of noise in that it may result in a light sensor 305 receiving, and consequently measuring, approximately the expected intensity of received light. Unaccounted for, this could result in an erroneous determination that the direct path between the light source 304 and the light sensor 305 is unobstructed and thus unoccupied. In some embodiments, the monitoring system controller 103 may account for this possibility by looking at inconsistencies in the apparent light source-light sensor pairs that have obstructed sightlines. In some embodiments, the monitoring system controller 103 may account for the possibility of first-order specular reflections (i.e., light reflected only once) by evaluating the measurements obtained by the overall light sensor array 106 to detect instances where the measured light intensity is reduced below the expected baseline intensity for an obstructed path to the light source 304 but it significantly greater than would be expected from only diffuse reflections (along with possible outside ambient light).

FIG. 7 is a flowchart illustrating an exemplary method of configuring a storage monitoring system.

To start, as shown by block 702 of FIG. 7, the storage monitoring system 102 may obtain information about the dimensions of the volume of space 403.

After the storage monitoring system 102 obtains information about the dimensions of the volume of space 403, as shown by block 703 of FIG. 7, the storage monitoring system 102 may obtain information about the positions of the light sources 305 and the light sensors 306 relative to the volume of space 403.

After the storage monitoring system 102 obtains information about the positions of the light sources and light sensors relative to the volume of space 403, as shown by block 704 of FIG. 7, the storage monitoring system 102 may obtain information about the positions of the light sources 305 and the light sensors 306 relative to each other.

After the storage monitoring system 102 obtains information about the positions of the light sources and light sensors relative to each other, as shown by block 705 of FIG. 7, the storage monitoring system 102 may assign portions of the volume of space 403 to light source-light sensor pairs.

After the storage monitoring system 102 assigns portions of the volume of space 403 to the light source-light sensor pairs, as shown by block 706 of FIG. 7, the storage monitoring system 102 may obtain initial baseline intensity measurements using the light sources 305 and the light sensors 306 while the volume of space 403 is empty of any physical objects.

FIG. 8 is a flowchart illustrating an exemplary method of generating and measuring intensities of near-visible light, such as was described in FIG. 2.

To start, as shown by block 802 of FIG. 8, the monitoring system controller 103 may select the next remaining light source 305 to radiate near-visible light.

After the monitoring system controller 103 may select the next remaining light source 305, as shown by block 803 of FIG. 8, the monitoring system controller 103 may interact with the lighting system 104 to cause the next remaining light source 305 to radiate near-visible light.

After the next remaining light source 305 produces the near-visible light, as shown by block 804 of FIG. 8, the monitoring system controller 103 may interact with the lighting system 104 to cause each of the light sensors 306 to receive and assess the intensity of the incident near-visible like radiated by the selected light source 305.

If there are remaining light sources that have yet to radiate near-visible light for this cycle, as shown by block 805 of FIG. 8, the monitoring system controller 103 may return to block 802 to select the next remaining light source 305. Otherwise, the method may end.

FIG. 9 is a flowchart illustrating an exemplary method of determining approximate positioning information, such as was described in FIG. 2.

To start, as shown by block 902 of FIG. 9, the monitoring system controller 103 may select the next remaining unprocessed near-visible light intensity measurement.

After the monitoring system controller 103 selects the next remaining unprocessed near-visible light intensity measurement, as shown by block 903 of FIG. 9, the monitoring system controller 103 may retrieve a preconfigured baseline near-visible light measurement associated with the same light source-light sensor pair as the selected near-visible light intensity measurement.

After the monitoring system controller 103 retrieves the preconfigured baseline near-visible light measurement, as shown by block 904 of FIG. 9, the monitoring system controller 103 may compare the selected near-visible light intensity measurement to the preconfigured baseline near-visible light measurement.

After the monitoring system controller 103 compares the selected near-visible light intensity measurement to the preconfigured baseline near-visible light measurement, as shown by block 905 of FIG. 9, the monitoring system controller 103 determines an amount of dimming for the light source-light sensor pair associated with the selected near-visible light intensity measurement based on the difference between the selected near-visible light intensity measurement and the preconfigured baseline near-visible light measurement.

If there are remaining unprocessed near-visible light intensity measurements, as shown by block 906 of FIG. 9, the monitoring system controller 103 may return to block 902 to select the next remaining unprocessed near-visible light intensity measurement. Otherwise, the method may end.

FIG. 10 is a flowchart illustrating an exemplary method of determining information about the occupancy of an enclosed space using attenuation information, such as was described in FIG. 2.

To start, as shown by block 1002 of FIG. 10, the monitoring system controller 103 may determine for each light source-light sensor pair if the attenuation information for the light source-light sensor pair exceeds a threshold amount of attenuation.

After the monitoring system controller 103 determines if the attenuation information for the various light source-light sensor pairs exceeds the threshold, as shown by block 1003 of FIG. 10, the monitoring system controller 103 may mark each light source-light sensor pair whose attenuation information exceeds the threshold as being occupied and marks each light source-light sensor pair whose attenuation information does not exceed the threshold as being unoccupied.

After the monitoring system controller 103 marks the light source-light sensor pairs, as shown by block 1004 of FIG. 10, the monitoring system controller 103 may determine, for each of the light source-light sensor pairs, that the physical volume of the storage space assigned to the respective light source-light sensor pair is occupied if the light source-light sensor pair is marked as being occupied and is unoccupied if the light source-light sensor pair is marked as being unoccupied.

After the monitoring system controller 103 determines whether the assigned portions of the volume of space 403 are occupied or unoccupied, as shown by block 1005 of FIG. 10, the monitoring system controller 103 may determine the amount of the physical volume of the storage spaced that is occupied by physical objects by calculating the total physical volume associated with the light source-light sensor pairs that are marked as being occupied divided by the total physical volume of all the light source-light sensor pairs.

Based on differences between the measured intensity and the expected baseline, the monitoring system controller 103 may be configured to determine one or more parameters indicative of the utilization of the space 403. As an example, based on such difference, the monitoring system controller 103 may be configured to estimate or otherwise determine a value indicating an amount of the space 403 that occupied by physical objects. For example, the value may indicate a percentage of the space that is occupied by physical objects, although other values may be determined in other examples. In some embodiments, the controller 103 is configured to transmit such parameter to an external device 107, which then displays the parameter or information based on such parameter (e.g., a graphical element) to a user. In some embodiments, the controller 103 may be configured to compare the parameter to a threshold and transmit information indicative of the comparison. As an example, the threshold may correspond to a utilization goal for the space, and the transmitted information may indicate whether such goal is satisfied by indicating whether the threshold is exceeded (e.g., whether the percentage of utilization is above a desired threshold). In other embodiments, yet other types of information may be reported based on the measurements of the intensity of light illuminating the light sensors 306.

FIG. 11 is a flowchart of an exemplary method of using a storage monitoring system to determine the available storage capacity of an enclosed space as described above. To start, a light source 304 is selected and the other light sources 304 are dimmed or turned off. More precisely, as shown by block 1102 of FIG. 11, the monitoring system controller 103 may select an unmeasured light source 304 and then interact with the light source array 105 to substantially dim all but the selected light source 304.

After the unselected light sources 304 are dimmed, the light sensors may measure the intensity of the incoming light. More precisely, as shown by block 1103 of FIG. 11, the monitoring system controller 103 may interact with the light sensor array 106 to measure the intensity of the light incident to each of the light sensors 305.

After the desired measurements are obtained from the light sensor array 106 for the selected light source 304, the monitoring system controller 103 may repeat the previous steps for another, unselected light source 304. Specifically, as shown by block 1104 of FIG. 11, the monitoring system controller 103 may repeat the steps described in block 1102 and 1103 for each of the light sources 304.

After each light source 304 has been selected and the associated measurements obtained from the light sensor array 106, the measurements may be evaluated to determine which pairs of light sources and light sensors indicate the light sensor is in a shadow. Specifically, as shown by block 1105 of FIG. 11, the monitoring system controller 103 may analyze the collective measurements obtained from the light sensor array 106 to determine which pairs of light sources and light sensors have an intervening obstruction.

After the light source-light sensor pairs with obstructed sightlines have been identified, the known geometry of the obstructed sightlines may be processed to determine which portions of the volume of space 403 are unoccupied or occupied. Specifically, as shown by block 1106 of FIG. 11, the monitoring system controller 103 may determine, based on the light source-light sensor pairs found to have an obstructed sightline, occupied areas of the volume of space 403. In addition, based on the signatures detected by the light sensor array 106, the monitoring system controller 103 may estimate how much (e.g., amount or percentage) of each assigned area is occupied.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The devices, modules, and other functional units described in this disclosure can be implemented by hardware, or software, or a combination of hardware and software. In some embodiments, functions described as being implemented in hardware may instead be implemented in software or a combination of hardware and software. Likewise, in some embodiments, functions described as being implemented in software may instead be implemented in hardware or a combination of hardware and software. If something is implemented by software, it may be stored in a non-transitory computer-readable media, like the computer-readable media described above. Such software, when executed by a processor, may perform the function of the device, module or other functional unit the software is implementing. The above-described devices, modules, and other functions units may also be combined or may be further divided into a plurality of sub-units.

In some places references are made to standards, including standard methods of performing particular tasks. These standards are revised from time to time, and, unless explicitly stated otherwise, reference to standards in this disclosure refer to the most recent published standard as of the time of filing.

Spatially relative terms, such as "under", "below", "lower", "over", "upper" and the like, may be used herein for ease of description to describe one element or feature's relationship to another when the apparatus is right side up.

When a feature is referred to as being "on" another feature, the feature may be directly on the other feature with no intervening features present or it may be indirectly on the other feature with intervening features being present. In contrast, when a feature is referred to as being "directly on" another feature, the feature is directly on the other feature with no intervening features present. It will also be understood that, when a feature is referred to as being "connected", "attached" or "coupled" to another feature, the feature may be directly connected, attached or coupled to the other feature with no intervening features present or it may be indirectly connected, attached or coupled to the other feature with intervening features being present. In contrast, when a feature is referred to as being "directly connected", "directly attached" or "directly coupled" to another feature, the feature is directly connected, directly attached, or directly coupled to the other feature with not intervening features present.

The terms "about" and "approximately" shall generally mean an acceptable degree of error or variation for the quantity measured given the nature or precision of the measurements. Typical, exemplary degrees of error or variation are within 20%, preferably within 10%, more preferably within 5%, and still more preferably within 1% of a given value or range of values. Numerical quantities given in this description are approximate unless stated otherwise, meaning that the term "about" or "approximately" can be inferred when not expressly stated.

Ordinal numbers or terms such as "first" and "second" are used only to differentiate an entity or operation from another entity or operation, and do not require or imply any actual relationship or sequence between these entities or operations. Thus, a first feature or element could be termed a second feature or element, and similarly, a second feature or element could be termed a first feature or element without departing from the teachings of the present disclosure. Moreover, the words "comprising," "having," "containing," and "including," and other similar forms are intended to be equivalent in meaning and be open ended in that any items following any one of these words is not meant to be an exhaustive listing of such items and is also not meant to be limited to only the listed items.

As used herein, unless specifically stated otherwise, the terms "or" and "at least one of" encompasses all possible combinations, except where infeasible. For example, if it is stated that a component may include "A or B," then, unless specifically stated otherwise or infeasible, the component may include "A," "B," or "A and B." As a second example, if it is stated that a component includes "at least one of A, B, or C," then, unless specifically stated otherwise or infeasible, the component may include "A," "B," "C," "A and B," "A and C," "B and C," or "A, B, and C." This same construction applies to longer lists (e.g., "may include A, B, C, or D").

As used herein, the singular forms "a", "an," and "the" are intended to include the plural forms as well, unless the context clearly indicates otherwise.

Any statements in this disclosure criticizing or disparaging aspects of the prior art are not intended to indicate that what is claimed excludes any of those criticized or disparaged aspects of the prior art.

Any given element or step of the embodiments disclosed above may be embodied in a single element or step or may be embodied in multiple elements or steps. Moreover, any given element or step of the embodiments disclosed above may be combined and embodied in single element or step or may be combined and embodied in multiple elements or steps.

The sequence of steps shown in the various figures are only for illustrative purposes and do not necessarily indicate that embodiments of the present disclosure are limited to any particular sequence of steps. As such, steps performed by various embodiments of the present disclosure can be performed in a different order while implementing the same method.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Now, therefore, the following is claimed:
1. A method for monitoring a storage space, comprising:
radiating near-visible light from one or more respective source positions within a physical volume of a storage space, wherein the near-visible light includes electromagnetic radiation within an infrared spectrum or an ultraviolet spectrum;
evaluating the near-visible light radiated from the one or more source positions to obtain one or more intensity measurements of said near-visible light,
wherein:
each of the one or more intensity measurements of the near-visible light radiated from the one or more source positions are from an assessment of an intensity of near-visible light radiating from a respective source position being received at a respective sensor position of one or more sensor positions within the physical volume of the storage space; and
the one or more source positions and the one or more sensor positions are located relative to one another such that the radiated near-visible light propagates through the physical volume of the storage space before the intensities of the near-visible light are assessed; and
determining occupancy information indicating an amount of the physical volume of the storage space occupied by physical objects by:
determining for each of the one or more intensity measurements, an amount of dimming for an associated light source-light sensor pair based on a difference between the respective intensity measurement and a corresponding predefined baseline intensity measurement associated with a same source-light sensor pair;
determining, for each light source-light sensor pair, if attenuation information for the light source-light sensor pair exceeds a threshold amount of attenuation; and
calculating the amount of the physical volume of the storage space occupied by physical objects based on a total physical volume associated with light source-light sensor pairs that exceed the threshold amount of attenuation divided by a total physical volume of all the light source-light sensor pairs, wherein each of the one or more predefined baseline intensity measurements are associated with an expected measurement of the intensity of near-visible light for a given pair of radiating source position and measuring sensor position.
2. The method of claim 1, further comprising transmitting the occupancy information to an external system.
3. The method of claim 1, wherein at least one of either the source positions or the sensor positions is associated with a lighting system.
4. The method of claim 1, wherein, for each of the one or more intensity measurements, the source position associated with the radiating the near-visible light and the sensor with obtaining the measurement are positioned relative to one another such that the near-visible light travels through the physical volume of the storage space.
5. The method of claim 1, wherein each of the one or more predefined baseline intensity measurements are associated with an expected measurement of the intensity of near-visible light for a given pair of radiating source position and measuring sensor position when the physical volume of the storage space is unoccupied by physical objects.
6. The method of claim 4, further comprising determining the predefined baseline intensity measurements by:
receiving external input indicating the physical volume of the storage space is unoccupied;

performing a plurality of iterations of sequentially radiating near-visible light at each of the one or more source position and obtaining a measurement of the intensity of the near-visible light as received at each of the one or more sensor positions; and averaging the obtained measurements of the intensity of the near-visible light across the plurality of iterations based on the identity of the radiating source position and measuring sensor position, wherein the resulting averaged measurements of the intensity are set as the predefined baseline intensity measurements.

7. The method of claim 4, wherein:

each of the one or more source positions is associated with different discrete instances of radiating near-visible light; and for each of the one or more source positions, each of the one or more sensor positions has an intensity measurement of the near-visible light generated at the respective source position that is obtained from an analysis of the near-visible light illuminating the respective sensor position.

8. The method of claim 6, wherein:

the one or more predefined baseline intensity measurements comprise expected measurements for each pair of a source position from the one or more source positions and a sensor position from the one or more sensor positions; and comparing the one or more intensity measurements of the radiated near-visible light to one or more predefined baseline intensity measurements comprises comparing the intensity measurement for each of the pairs of source positions and sensor positions to the corresponding predefined baseline intensity measurement for the respective pair of source positions and sensor positions.

9. A storage monitoring system, comprising:

one or more light sources configured to generate near-visible light, wherein the near-visible light includes electromagnetic radiation within an infrared spectrum or an ultraviolet spectrum, and wherein:

each of the light sources are located at a respective source position within a physical volume of a storage space; and the generated near-visible light is radiated by one of the one or more light sources from the source position associated with the respective light source;

one or more light sensors configured to obtain one or more intensity measurements of the radiated near-visible light illuminating the one or more light sensors, wherein:

each of the one or more light sensors are located at a respective sensor position within the physical volume of the storage space; and the source positions of the one or more light sources and the sensor positions of the one or more light sensors are located relative to one another such that the radiated near-visible light propagates through the physical volume of the storage space before illuminating the one or more light sensors; and a controller connected to the one or more light sources and the one or more light sensors, wherein:

the controller is configured to determine occupancy information indicating an amount of the physical volume of the storage space occupied by physical objects by:

determining for each of the one or more intensity measurements, an amount of dimming for an associated light source-light sensor pair based on a difference between the respective intensity measurement and a corresponding predefined baseline intensity measurement associated with a same source-light sensor pair;

determining, for each light source-light sensor pair, if attenuation information for the light source-light sensor pair exceeds a threshold amount of attenuation; and calculating the amount of the physical volume of the storage space occupied by physical objects based on a total physical volume associated with light source-light sensor pairs that exceed the threshold amount of attenuation divided by a total physical volume of all the light source-light sensor pairs; and each of the one or more predefined baseline intensity measurements are associated with an expected measurement of the intensity of near-visible light for a given pair of radiating source position and measuring sensor position.

10. The system of claim 9, further comprising an input/output (IO) interface configured to transmit the occupancy information to an external system.

11. The system of claim 9, wherein at least one of either the light sources or the light sensors is collocated with a lighting system.

12. The system of claim 9, wherein, for each of the one or more intensity measurements, the source position of the light source associated with generating the near-visible light and the sensor position of the light sensor associated with obtaining the intensity measurement are positioned relative to one another such that the near-visible light travels through the physical volume of the storage space.

13. The system of claim 9, wherein each of the one or more predefined baseline intensity measurements are associated with an expected measurement of the intensity of near-visible light for a given pair of generating light source and measuring light sensor when the physical volume of the storage space is unoccupied by physical objects.

14. The system of claim 13, wherein the controller is further configured to determine the predefined baseline intensity measurements by:

receiving external input indicating the physical volume of the storage space is unoccupied;

performing a plurality of iterations of sequentially generating near-visible light by each of the one or more light sources and obtaining a measurement of the intensity of the near-visible light as received by each of the one or more light sensors; and averaging the obtained measurements of the intensity of the near-visible light across the plurality of iterations based on the identity of the generating light source and measuring light sensor, wherein the resulting averaged measurements of the intensity are set as the predefined baseline intensity measurements.

15. The system of claim 13, wherein:

each of the one or more light sources generates near-visible light at different discrete instances; and for each of the one or more light sources, each of the one or more light sensors obtains an intensity measurement of the near-visible light generated by the respective light sensor at the associated discrete instance.

16. The system of claim 15, wherein:

the one or more predefined baseline intensity measurements comprise expected measurements for each pair of a light source from the one or more light sources and a light sensor from the one or more light sensors; and comparing the one or more intensity measurements of the radiated near-visible light to one or more predefined baseline intensity measurements comprises comparing the intensity measurement for each of the pairs of light sources and light sensors to the corresponding predefined baseline intensity measurement for the respective pair of light sources and light sensors.

17. A non-transitory computer readable medium comprising instructions that, when executed by at least one processor, cause the at least one processor to monitor a storage space by:

radiating near-visible light from one or more respective source positions within a physical volume of a storage space, wherein the near-visible light includes electromagnetic radiation within an infrared spectrum or an ultraviolet spectrum;

evaluating the near-visible light radiated from the one or more source positions to obtain one or more intensity measurements of said near-visible light, wherein:

each of the one or more intensity measurements of the near-visible light radiated from the one or more source positions are from an assessment of an intensity of near-visible light radiating from a respective source position being received at a respective sensor position of one or more sensor positions within the physical volume of the storage space; and the one or more source positions and the one or more sensor positions are located relative to one another such that the radiated near-visible light propagates through the physical volume of the storage space before the intensities of the near-visible light are assessed; and determining occupancy information indicating an amount of the physical volume of the storage space occupied by physical objects by:

determining for each of the one or more intensity measurements, an amount of dimming for an associated light source-light sensor pair based on a difference between the respective intensity measurement and a corresponding predefined baseline intensity measurement associated with a same source-light sensor pair;

determining, for each light source-light sensor pair, if attenuation information for the light source-light sensor pair exceeds a threshold amount of attenuation; and calculating the amount of the physical volume of the storage space occupied by physical objects based on a total physical volume associated with light source-light sensor pairs that exceed the threshold amount of attenuation divided by a total physical volume of all the light source-light sensor pairs, wherein each of the one or more predefined baseline intensity measurements are associated with an expected measurement of the intensity of near-visible light for a given pair of radiating source position and measuring sensor position.

18. The non-transitory computer readable medium of claim 17, wherein the instructions further cause the at least one processor to monitor a storage space by transmitting the occupancy information to an external system.

19. The non-transitory computer readable medium of claim 17, wherein at least one of either the source positions or the sensor positions is associated with a lighting system.

20. The non-transitory computer readable medium of claim 17, wherein, for each of the one or more intensity measurements, the source position associated with the radiating the near-visible light and the sensor with obtaining the measurement are positioned relative to one another such that the near-visible light travels through the physical volume of the storage space.

21. The non-transitory computer readable medium of claim 17, wherein each of the one or more predefined baseline intensity measurements are associated with an expected measurement of the intensity of near-visible light for a given pair of radiating source position and measuring sensor position when the physical volume of the storage space is unoccupied by physical objects.

22. The non-transitory computer readable medium of claim 21, wherein the instructions further cause the at least one processor to determine the predefined baseline signal strength measurement by:

receiving external input indicating the physical volume of the storage space is unoccupied;

performing a plurality of iterations of sequentially radiating near-visible light at each of the one or more source position and obtaining a measurement of the intensity of the near-visible light as received at each of the one or more sensor positions; and averaging the obtained measurements of the intensity of the near-visible light across the plurality of iterations based on the identity of the radiating source position and at least intensity are set as the predefined baseline intensity measurements.

23. The non-transitory computer readable medium of claim 21, wherein:

each of the one or more source positions is associated with different discrete instances of radiating near-visible light; and for each of the one or more source positions, each of the one or more sensor positions has an intensity measurement of the near-visible light generated at the respective source position that is obtained from an analysis of the near-visible light illuminating the respective sensor position.

24. The non-transitory computer readable medium of claim 23, wherein:

the one or more predefined baseline intensity measurements comprise expected measurements for each pair of a source position from the one or more source positions and a sensor position from the one or more sensor positions; and comparing the one or more intensity measurements of the radiated near-visible light to one or more predefined baseline intensity measurements comprises comparing the intensity measurement for each of the pairs of source positions and sensor positions to the corresponding predefined baseline intensity measurement for the respective pair of source positions and sensor positions.

* * * * *